May 27, 1924.
B. F. QUINTANA
WATER POWER SYSTEM
Filed Jan. 15, 1923    2 Sheets-Sheet 1
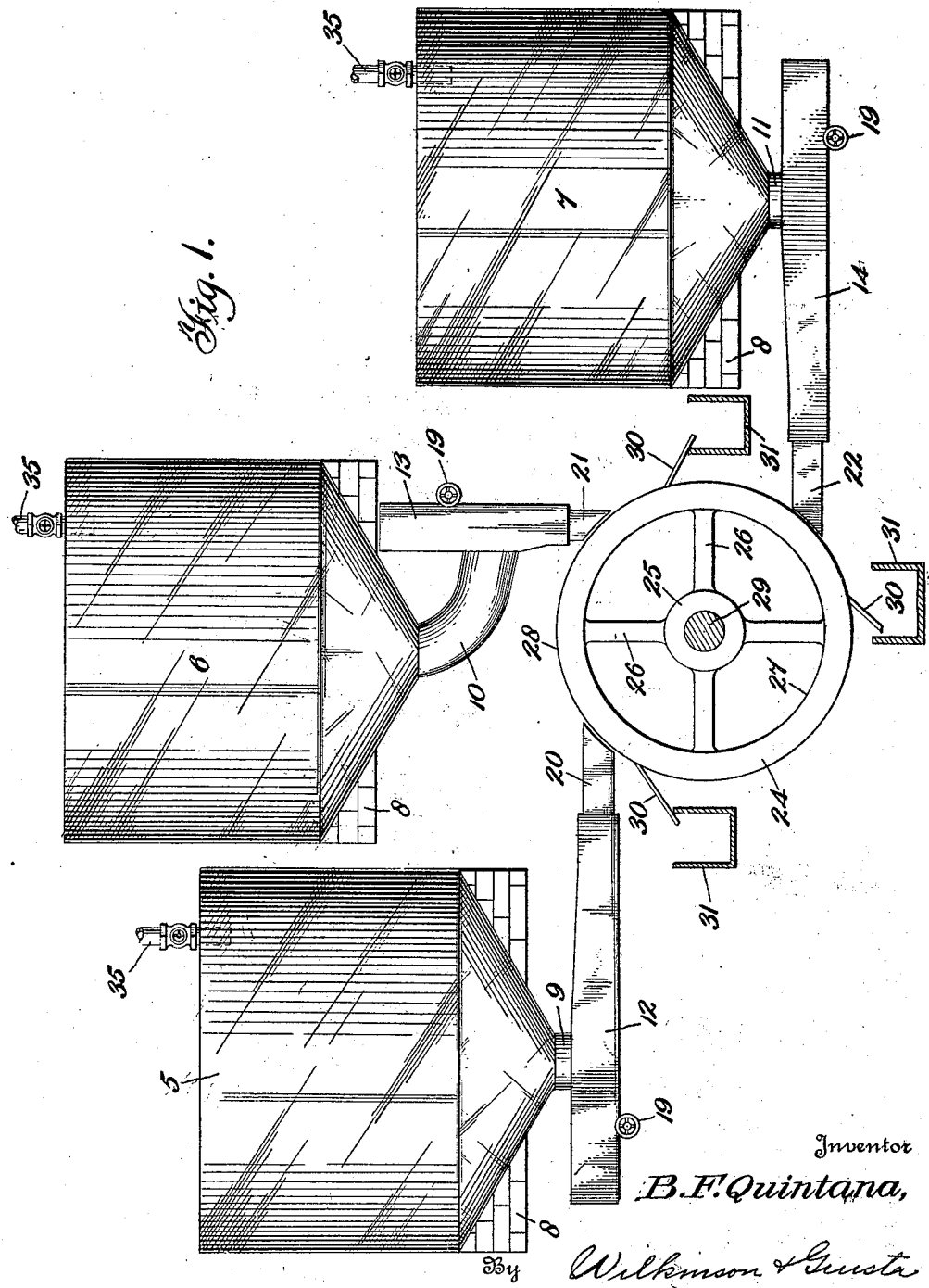

May 27, 1924.
B. F. QUINTANA
1,495,798
WATER POWER SYSTEM
Filed Jan. 15, 1923
2 Sheets-Sheet 2
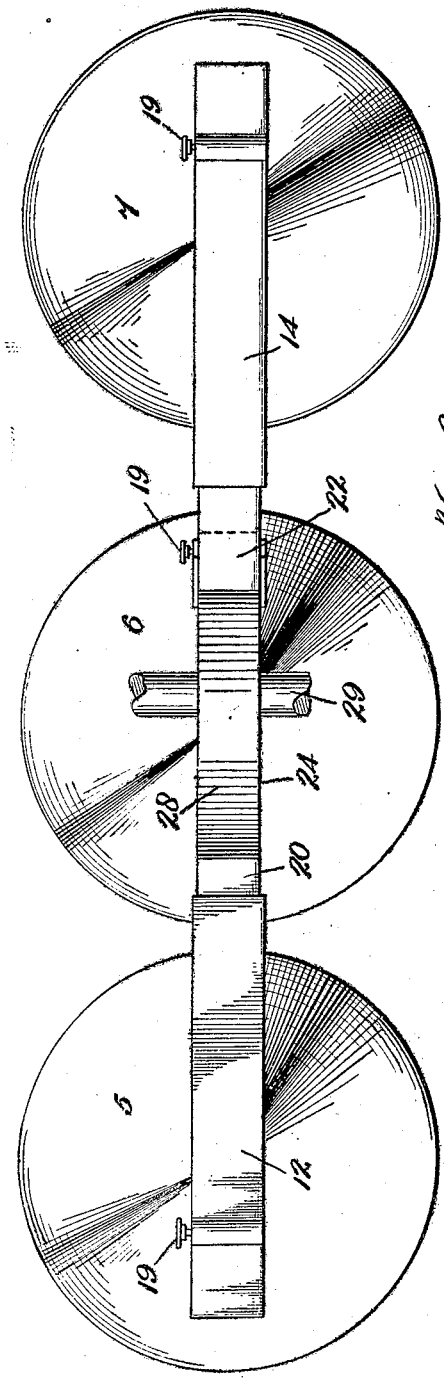
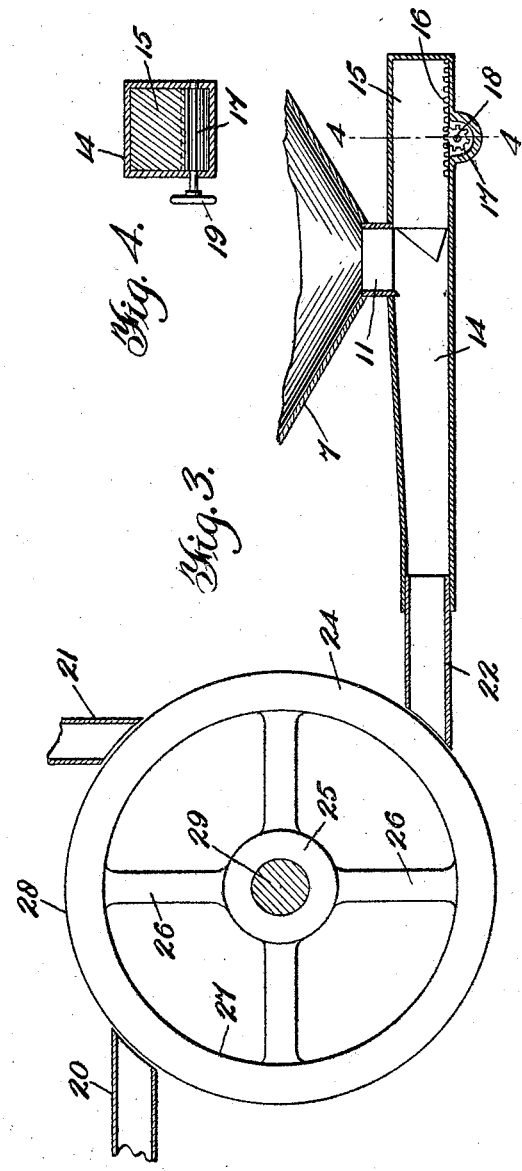
Inventor
B. F. Quintana,
By Wilkinson & Giusta
Attorneys Patented May 27, 1924.

1,495,798

UNITED STATES PATENT OFFICE.

BENIGNO FERNANDEZ QUINTANA, OF TAMPA, FLORIDA.

WATER-POWER SYSTEM.

Application filed January 15, 1923. Serial No. 612,758.

*To all whom it may concern:*

Be it known that I, BENIGNO FERNANDEZ QUINTANA, a subject of the King of Spain, residing at Tampa, in the county of Hillsborough and State of Florida, have invented certain new and useful Improvements in Water-Power Systems, of which the following is a specification.

This invention relates to power plants, and more especially to a plant for transforming the energy stored in large quantities of water, and has for its principal object to provide a plant of relatively high efficiency wherein the pressure due to the weight of the water is utilized, as well as the flow of the said water, to produce power.

A further object of the invention is to provide a plant of the character described which is especially adapted for installation and use in places where large quantities of water are available, while other power producing means are relatively scarce or inaccessible.

With the above and other objects in view, which will appear as the description proceeds, the invention consists in the novel details of construction and combinations of parts more fully hereinafter disclosed and particularly pointed out in the appended claims.

In the accompanying drawings forming a part of this specification in which like numerals designate like parts in all the views;

Figure 1 is a diagrammatic side elevational view, partly in section, of a plant constructed in accordance with the present invention;

Fig. 2 is an inverted plan view of the parts shown in Fig. 1;

Fig. 3 is an enlarged sectional elevational view of the wheel and the discharge nozzles illustrating one means for controlling the flow of the water to the said wheel; and, Fig. 4 is a cross-sectional view, taken approximately on the plane indicated by the line 4—4 of Fig. 3, showing the means for moving the controlling valve.

In the said drawings, the numerals 5, 6, and 7 indicate tanks or reservoirs of metal, concrete or other suitable construction which are adapted to receive and hold relatively large quantities of water, say 100,000 gallons or more. These said tanks may be supported upon suitable bases 8, substantially as shown, and they may be respectively provided with discharge passages 9, 10 and 11, communicating with valve chambers 12, 13 and 14. The said valve chambers may be of any suitable construction, but are here shown as comprising elongated enclosures, each containing a slidable valve member, such as 15, see Fig. 3, which valve members may be provided with rack teeth 16, engaged by the teeth of pinions 17 carried by a stem 18, which is provided with a hand wheel 19, whereby the said stem and pinion may be rotated to control the position of the valve member 15 through the rack and pinion connection.

The valve chambers 12, 13 and 14 are also provided with the discharge nozzles 20, 21, and 22 respectively, which are slidably mounted within the said valve chambers, as will be clear from Fig. 1 and 3, whereby the position of their discharge ends relative to the surface of the wheel or turbine 24 may be controlled.

In other words, the power developed by the said wheel 24, in the present invention, is partially dependent upon the position of the discharge end of the nozzles 20, 21 and 22, relative to the surface of the said wheel, the closer the discharge nozzles are to the said surface within certain limits, the greater being the power developed. In actual practice the said nozzles should preferably not be spaced more than say one-quarter or one-half an inch from the surface of the wheel in order to develop the maximum power.

The said wheel may be of any desired construction but is here shown as comprising a hub 25 from which radiate a plurality of spokes 26 to the outer ends of which is secured the rim 27. The outer circumferential surface 28 of the said rim is perfectly smooth instead of being provided with the usual blades, and the movement of the wheel is accomplished solely through the frictional contact of the water discharged from the nozzles 20, 21 and 22, with the said smooth surface 28. The said wheel may be mounted upon the power shaft 29, journalled in suitable bearings and provided with a pulley or other power transmission member, not shown.

The wheel 24 may be of any desired width and the nozzles 20, 21 and 22 are, or may be, of a width substantially equal to that of the wheel, so as to discharge water against substantially the entire transverse surface of its outer circumference. After the water has acted upon the surface of the wheel to produce rotation thereof through its frictional engagement with said surface, it may be caught by suitable deflecting plates such as 30, which catch and direct it into suitable troughs or containers 31, from which it may be conducted for any purpose desired. The water supplied to the tanks or reservoirs 5, 6 and 7 may be introduced through the valved supply pipes 35, leading from any suitable source of supply to the said tanks.

While one form of the invention has been illustrated and described, it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. A water power system comprising a water wheel having a smooth peripheral surface, a plurality of tanks of large capacity situated at different elevations above and at the sides of said wheel, valve boxes arranged below and communicating with said tanks, said valve boxes being each arranged substantially at a tangent to the surface of the wheel, valves in said valve boxes for regulating the delivery of water from the tanks to the boxes under hydrostatic pressure, nozzles mounted in the ends of said valve boxes and being slidable axially toward and from the peripheral surface of said wheel, said nozzles being substantially as wide as the transverse dimension of the peripheral surface of the wheel and being relatively deep to receive constantly a relatively great quantity of the water under said hydrostatic pressure and adapted to direct this great quantity of water against the smooth peripheral surface of the wheel, the outer delivery ends of said nozzles being curved substantially to conform to the peripheral surface of the wheel and arranged to direct the water against the wheel at an angle between a tangent and radius.

2. A water power system comprising a water wheel mounted to rotate and having a smooth peripheral surface, a number of water tanks of great capacity situated above and at the sides of said wheel, valve boxes communicating with the tanks separately, valves in the boxes for controlling the flow of water, and adjustable nozzles in the ends of the valve boxes for directing the water against the wheel at various degrees of effectiveness but constantly at an angle to the smooth peripheral surface of the wheel between a tangent and the radius of the wheel.

3. A water power system comprising a water wheel mounted for rotation and having a smooth peripheral surface, a plurality of water tanks of great capacity situated above and at the sides of the wheel, valve boxes communicating with the tanks, valves in the boxes for controlling the flow of water, the valve boxes of the side tanks being substantially horizontal and disposed at approximately diametrically opposite portions of the wheel, the valve box of the upper tank being substantially vertical and adapted to direct water against the upper portion of the wheel to one side of the center thereof opposite the position of the upper valve box of one of the side tanks, nozzles adjustably mounted in said valve boxes toward and from the wheel and adapted to simultaneously direct the water against the smooth peripheral surface of the wheel.

BENIGNO FERNANDEZ QUINTANA.